L. DE FLOREZ.
FLOW REGULATING APPARATUS.
APPLICATION FILED SEPT. 3, 1919.

1,426,718.

Patented Aug. 22, 1922.
2 SHEETS—SHEET 1.

Inventor
Luis de Florez
By his Attorneys
Emery Varney Blair and Hoguet

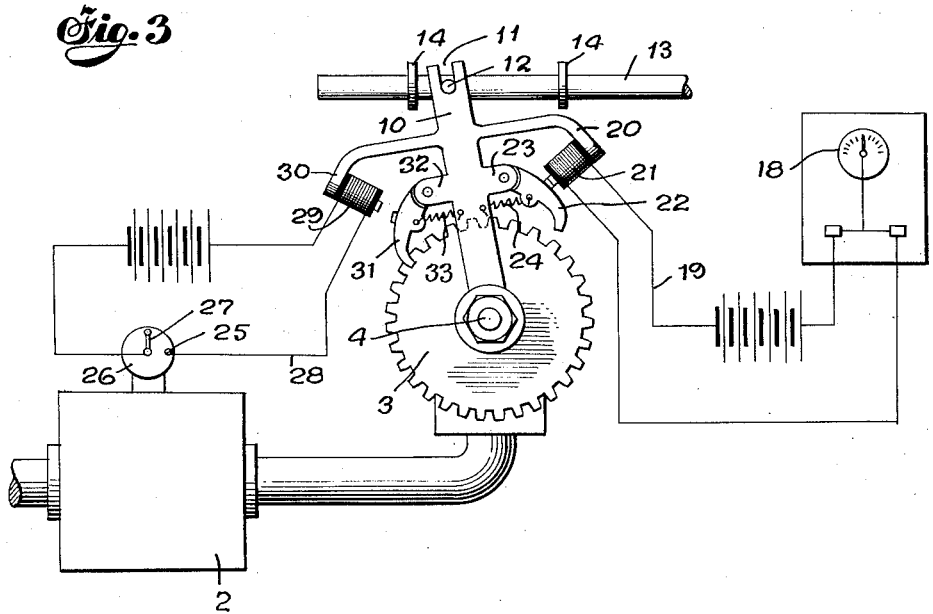

UNITED STATES PATENT OFFICE.

LUIS DE FLOREZ, OF BOSTON, MASSACHUSETTS.

FLOW-REGULATING APPARATUS. REISSUED

1,426,718.  Specification of Letters Patent.  Patented Aug. 22, 1922.

Application filed September 3, 1919. Serial No. 321,422.

*To all whom it may concern:*

Be it known that I, LUIS DE FLOREZ, a citizen of the United States, residing in Boston, in the county of Suffolk and State of Massachusetts, have invented an Improvement in Flow-Regulating Apparatus, of which the following is a specification.

The present invention relates to an improvement in flow regulating devices, one object being to automatically control the effective opening of a valve interposed in a circulation system so that the fluid may pass through said opening in substantially constant predetermined volume. Although it is contemplated that the invention herein described may well be adapted for use with circulation systems in general, the embodiment shown in the attached drawings is in some respects more particularly adapted for use in controlling the flow of hydrocarbons.

In the process of cracking hydrocarbons, it has been noted that superior results are obtained where the oil flows through the system in substantially constant volume. Heretofore, in many cases, it has been customary to obtain some degree of regulation by hand manipulation of valves, based upon readings of a suitably arranged meter. This means of regulation required the constant attention of an operator in order to maintain the uniformity of flow within accepted limits. It has been found that, even with constant fore pressure, the volume of liquid flowing past a valve opening often varies to a considerable extent due perhaps to the formation of eddies or the occurrence of other phenomena in the conduit. It has also been noted that these eddies or interferences with the steady flow of the oil are broken up by a relatively slight manipulation of the valve stem in such a manner as to alternately enlarge and constrict the valve opening. Accordingly, another object of my invention is to automatically effect this movement of the valve stem in addition to providing means for maintaining a constant flow by suitable meter controlled stem actuating means.

Figure 2:
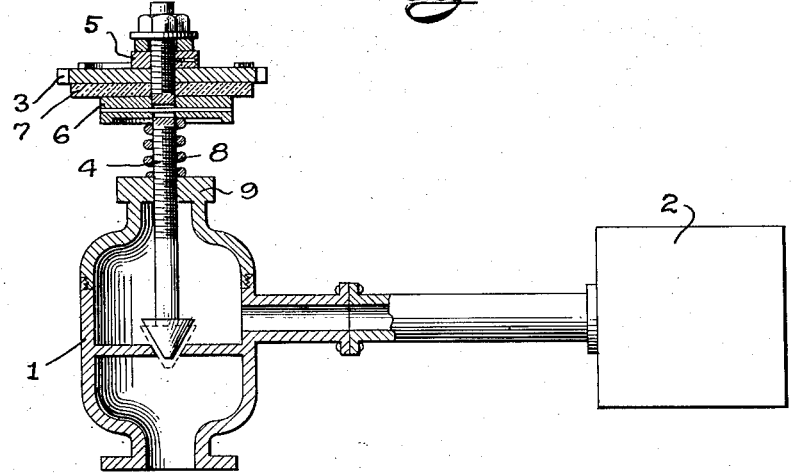
Figure 1:
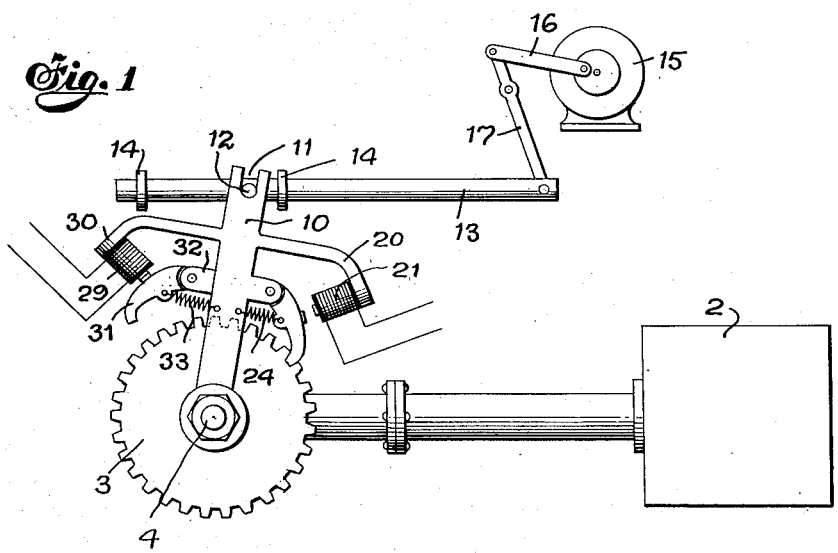

One embodiment of my invention is illustrated in the drawings accompanying the present specification, and in which Figure 1 is a view partly diagrammatic of regulating means for the valve, Figure 2, a view partly in central vertical section illustrating details of the valve construction and stem actuating means, Figure 3, a view similar to Figure 1 but more comprehensive and with the moving parts in a different phase of operation.

As shown in the drawings, a valve 1 and a meter 2 may be interposed in a circulation system and provided with suitable means whereby the valve opening may be controlled by the volume of flow passing through the meter. As shown in Figure 3, the valve opening may also be controlled periodically by clock regulated means entirely independent of the meter, said periodic control being intended to cause movement of the valve stem in one direction and the meter control being intended to cause movement of the valve stem in the opposite direction, thus producing the regulative enlarging and constricting of the valve opening above referred to.

Suitable means for moving the valve stem may include a ratchet 3 loosely mounted on a valve stem 4, and adapted to engage a flat surface of a collar 5 securely attached to said valve stem. Stem actuating frictional engagement between the ratchet 3 and the collar 5 may be attained by means of a slidable collar 6 arranged to press a friction disc 7 of fibrous or other suitable material into yielding contact with a flat surface of the ratchet 3, said yielding contact being secured by means of a compression spring 8 interposed between said slidable collar 6 and a flange 9 of the valve. The collar 6 is preferably retained on the valve stem against rotary movement by means of a pin passing through a suitable slotted recess in said stem. Thus, where the parts are properly adjusted, the valve, preferably of the needle type, may be manipulated by hand to approximately the required opening after which the automatic regulating means hereinabove referred to may be relied upon to maintain a constant flow through the opening. By loosely mounting the ratchet on the valve stem and maintaining just sufficient friction between the ratchet 3 and the collar 5 on the one hand and the friction disc 7 on the other hand, the danger of injuring the valve by careless manipulation may be measurably lessened.

To secure periodic and regulative movement of the valve stem, I provide a pawl carrying bar 10 arranged to be oscillated concentrically with respect to the ratchet 3, said bar being pivoted on the valve stem 4 for this purpose. The free end of said bar 10 has a slot 11 which engages a pin 12 mounted on a slide bar 13 supported in a pair of guides 14. Sliding motion is imparted to the slide bar 13 by means of a motor 15 or other suitable source of power, said motor having a crank shaft 16 pivoted to a lever 17 which in turn is pivoted to the slide bar 13. Thus, the rotary motion of the motor shaft is translated into oscillatory motion of the slide bar 13, said motion being imparted by the pin 12 to the oscillating bar 10. A clock 18 may be provided with suitable means for opening or closing an electric circuit 19 at predetermined intervals, said intervals being preferably of greater duration than the period of oscillation of the bar 10. An arm 20 extending from the bar 10 may support a solenoid 21 interposed in the circuit 19 and adapted to be energized when said circuit is closed by the clock mechanism above referred to. A pawl 22 may be pivoted on a lug 23 projecting from the bar 10, said pawl being retained in normal ratchet engaging position by means of a tension spring 24. In the embodiment illustrated in the drawings, the time controlled pawl 22 is withdrawn from contact with the ratchet upon the closing of the circuit 19, and while in such position, said pawl does not interfere with the adjusting movement of another pawl, the operation of which will be described later. From the foregoing, it will be seen that the oscillating arm 10 carries the pawl 22 back and forth with respect to the ratchet 3, and the clock controlled circuit 19 periodically releases said pawl from operative engagement with said ratchet so that, unless there were some compensating arrangement, the valve stem would be turned steadily in one direction while the time controlled pawl is disengaged from the ratchet.

However, assuming that the effect of lifting the time controlled pawl would be to steadily open the valve, meter controlled means are provided to counteract not only the valve opening operation of the clock controlled pawl, but also to positively close the valve opening when, for any other reason, the flow through the meter falls below a predetermined amount. Thus, a movable contact 25 may be positioned adjacent to any given marking on the meter dial 26, the index 27 of said dial being also included in the electric circuit 28 which includes the contact 25 and a solenoid 29 mounted on an arm 30 of the oscillating bar 10. A pawl 31 is pivotally mounted on a lug 32 and retained normally in ratchet engaging position by a tension spring 33. Thus, as long as the circuit 28 remains open, the pawl 31 will engage the ratchet 3 in such a manner as to open the valve, said opening movement of the valve continuing until the index 27 of the meter reaches the contact 25, thus indicating that the proper predetermined volume is flowing through the meter. At this point, the circuit 28 is closed. Pawl 31 is drawn up out of engagement with the ratchet 3 and will remain in this position until the meter registers a volume of flow which is less than the amount indicated adjacent to movable contact 25, during all or a part of which time pawl 22 may be normally closing the valve until disengaged from the ratchet by the time controlled mechanism heretofore described.

Where the valve opening is substantially correct at the beginning of operations, the back and forth movement of the valve stem may be confined within relatively small limits, preferably just enough to break up the eddies or to eliminate other interfering factors at the valve opening, this movement being the normal result when both pawls are in contact with the ratchet.

I claim as my invention:

1. In a flow regulating apparatus, the combination of a valve and a meter interposed in a circulation system, means for periodically actuating the valve stem in one direction, and meter controlled means for actuating said valve stem in the opposite direction.

2. In a flow regulating apparatus, the combination of a valve and a meter interposed in a circulation system, pawl and ratchet means for actuating the valve stem, means for oscillating the pawl means with respect to the ratchet, and electrical means operating independently of said oscillating means for controlling the engagement of a pawl with an adjacent ratchet.

3. In a flow regulating apparatus the combination of a valve and a meter interposed in a circulation system, a ratchet mounted on the valve stem, pawls mounted to actuate said ratchet in opposite directions, means for moving the pawls to and from operative engagement with said ratchet and means for oscillating said pawls independently of the movement to and from the ratchet.

4. In a flow regulating device, the combination of a valve and a meter interposed in a circulation system, a collar secured to the stem of said valve, a ratchet loosely mounted on said stem and in yielding frictional engagement with said collar, a pawl carrying bar mounted to oscillate concentrically with said ratchet, pawls mounted on said bar and arranged to move the ratchet in opposite directions, solenoids mounted on the bar and arranged adjacent to the pawls, means for periodically energizing one solenoid to move one pawl toward or away from the ratchet, meter controlled means for energizing the other solenoid to move the other pawl toward or away from the ratchet, and means for oscillating the pawl carrying bar.

5. In apparatus for regulating the flow through a valve opening, the combination of means operative independently of the extent of valve opening for periodically changing in one direction the extent of said opening, and means operative upon the occurrence of a predetermined extent of opening for changing said extent of opening in the opposite direction.

6. In apparatus for regulating the flow through a valve opening, the combination of means operative independently of the extent of valve opening for periodically changing in one direction the extent of said opening, and means operative upon the occurrence of a predetermined extent of opening for changing said extent of opening in the opposite direction and at a more rapid rate than said periodic changing.

In testimony whereof, I have signed my name to this specification this 28th day of August, 1919.

LUIS de FLOREZ.